TAPE TRANSPORT SYSTEM

Filed June 9, 1959 2 Sheets-Sheet 1

INVENTORS
THOMAS B. McGUIRE
ROBERT G. PARKS
BY Christie, Parker & Hale
ATTORNEYS.

TAPE TRANSPORT SYSTEM

Filed June 9, 1959 2 Sheets-Sheet 2

INVENTORS
THOMAS B. McGUIRE
BY ROBERT G. PARKS
Christie, Parker & Hale
ATTORNEYS United States Patent Office 2,997,247

Patented Aug. 22, 1961

2,997,247

TAPE TRANSPORT SYSTEM

Thomas B. McGuire, Santa Ana, and Robert G. Parks, Azusa, Calif., assignors to Burroughs Corporation, Detroit, Mich., a corporation of Michigan Filed June 9, 1959, Ser. No. 819,062
9 Claims. (Cl. 242—55.12)

This invention relates to tape transport systems and, more particularly, is concerned with a high speed transport for punched paper tape or the like.

The use of punched tape with stored digital information is well known. The dimensions of the paper tape and the size of the punched openings in the tape, and hence the number of characters which can be stored in a given length of tape, have been standardized to provide ten rows of punches per lineal inch of the tape. It is highly desirable to be able to stop the paper tape in reading out characters in a distance less than the distance between characters on the tape. This permits the tape to be stopped after reading out a particular character and have the tape in position to read the next successive character when the tape drive is again started. The requirement that the tape be capable of stopping in less than a character length has placed a limitation on the speed at which the tape can be driven, hence, the rate at which characters can be read off the punched paper tape.

The present invention provides a punched paper tape transport system which is capable of reading out characters at the rate of 1,000 characters per second, corresponding to tape speeds of 100 inches per second, and yet is capable of stopping the tape within less than a character length. This requires stopping times on the order of less than a millisecond. If braking times of this order are to be achieved, it is evident that the mass of the moving system must be very small in order to keep the braking forces within reasonable limits.

It has been the practice heretofore to store the tape on reels, one of the reels constituting a supply reel and the other constituting a take-up reel. The mass of these reels is necessarily large because of the weight of the tape stored on the reels and the rotating mass of the wheel drive motors. As a result, it is impractical to stop these reels at the higher rates required under the conditions set forth above. Various means have heretofore been proposed for isolating the inertia of the storage reels from the inertia of the moving tape through the operational zone where the characters are read so that the tape can be stopped at a faster rate than the reels. This is generally accomplished by providing slack loops between the respective reels and the operational zone, the slack loops permitting the reels to be stopped at a slower rate than the stopping of the tape in the operational zone.

The use of idler arms and rollers to maintain tension in the slack loops and to sense the length of the slack loops has been used heretofore. Any change in the length of the slack loops due to difference in speed of the tape at the reels and the tape as it passes through the operational zone is sensed by the movement of the idler arms, which movement in turn is used to control, by servo means, the speed of the associated reel drive motors. The use of such idler arms has the disadvantage that a very sudden change between the speed of the tape in the operational zone and the speed at the reels produces a rapid acceleration of the idler arms. Since the idler arms have substantial mass, a relatively large force may be imposed on the tape. As higher and higher stopping rates of the tape are attempted in the operational zone, the force imposed by the acceleration of the idler arms becomes excessive. The result is to either break the tape, or to drag excessive tape through the operational zone against the braking action imposed on the tape. The inertia effect of idler arms has been overcome in some applications by the use of vacuum columns or the like, but such technique does not lend itself to perforated tape, in addition to the fact that such technique is relatively complicated and expensive to implement.

The present invention provides a perforated tape transport apparatus in which stopping rates in the operational zone of a magnitude described above are achieved while using relatively high inertia slack loop idler arms. The present invention avoids the limitations of the prior art as described above, by providing a low inertia buffering arrangement between the operational zone and the take-up reel in addition to the above-mentioned slack loop and associated idler arm.

In brief, the present invention provides a high speed tape transport system having a high speed brake in the operational zone. The tape, after leaving the operational zone, is fed to a take-up reel. A slack loop, tensioned by an idler assembly, is provided between the operational zone and the take-up reel. In addition, according to the present invention, tape tensioning means having a small range of movement and pre-loaded to prevent movement of the additional tensioning means until the tension in the tape exceeds a pre-determined amount, is provided between the operational zone and the take-up reel. This additional tensioning means preferably takes the form of a pivotally supported arm, spring loaded against rotation about its pivot, across which the tape is drawn after leaving the operational zone. The excess tension produced in the tape by high acceleration of the idler arm is absorbed by the spring loading of the pivoted arm.

For a more complete understanding of the invention, reference should be made to the accompanying drawings, wherein.

Figure 1:
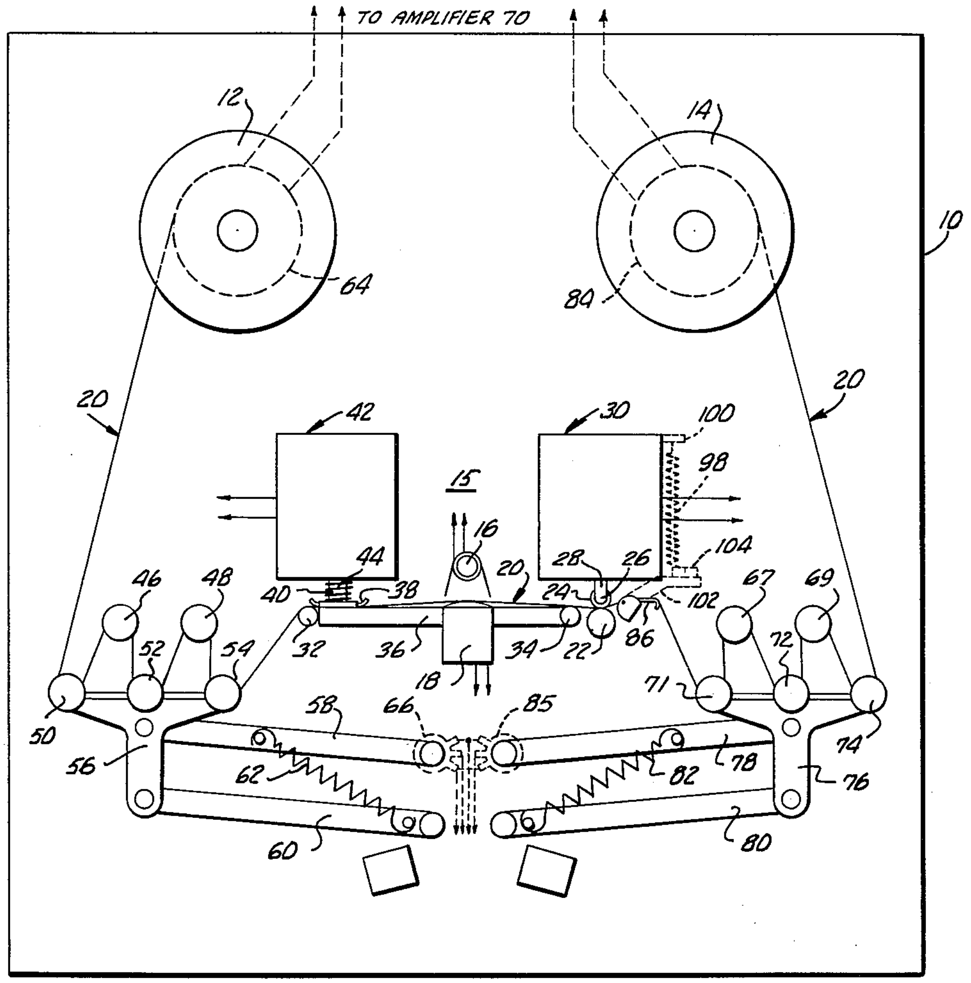
FIG. 1 is a front view of the tape transport system.

Referring to FIG. 1 in detail, the numeral 10 indicates generally the main frame of the tape transport system, which may be in the form of a flat metal plate. Rotatably supported from the frame 10 are a pair of reels, the supply reel being indicated at 12 and the take-up reel being indicated at 14. During a read-out operation, perforated paper tape is transferred from the supply reel 12 to the take-up reel 14 through an operational zone indicated generally at 15, in which is located means for sensing the pattern of holes in the tape. This may be done photo-electrically, for example, by providing a light 16 which illuminates the surface of the tape and by locating light sensing means such as photo-diodes beneath the light. The photo-sensing means is indicated generally at 18. The manner in which the holes are sensed forms no part of the present invention and is well known in the art.

The paper tape, as indicated at 20, is guided past the perforation sensing means 18 by a capstan drive including a capstan 22 driven by a constant speed electric motor (not shown) located behind the frame plate 10. The tape 20 is pressed against the capstan 22 by a pinch roller 24 rotatably supported by a bracket 26 secured to the end of a plunger 28 of a solenoid device indicated generally at 30. When the solenoid 30 is electrically energized, the roller 24 presses the tape 20 against the surface of the rotating capstan 22, causing the tape to be drawn past the sensing means 18.

The tape is guided past the sensing means 18 by guide pins 32 and 34 supported from the frame 10 and located on either side of the sensing means 18. The guide pins are preferably provided with shoulders which laterally position the tape.

After passing over the guide pin 32, the tape passes over a platen 36 which is bolted or otherwise secured to the frame plate 10. The paper tape is pressed against the platen 36 by a brake shoe 38 supported on the end of a solenoid actuated plunger 40. The plunger 40 forms part of an electrical braking solenoid, indicated generally at 42. The brake shoe 38 is pre-loaded to provide a continuous drag on the tape, by means of a spring 44 located between the shoe 38 and the solenoid 42. Energizing of the solenoid 42 presses the brake shoe 38 against the tape and platen 36 with sufficient force to stop the tape from a speed of 100 inches per second in a distance of 0.6 inch or less. Because the shoe rides continuously against the tape, due to the pre-loading of the spring 44, there is no lost motion time in the applying of the brake. Solenoids 30 and 42 are electrically interconnected so that the pinch roller 24 is always released when the brake 38 is applied.

Slack is provided in the tape between the supply reel 12 and the brake 38 by means of a pair of fixed idlers or tape guides 46 and 48 secured to the frame plate 10 and the three movable idlers or tape guides 50, 52, and 54. The tape, after leaving the supply reel 12, is threaded successively over the guides 50, 46, 52, 48, and 54, and thence across the guide pin 32. Thus, by varying the spacing between the relatively movable guides and the fixed guides, the amount of tape slack between the supply reel 12 and the brake can be adjusted. The guides are preferably in the form of rollers to reduce the frictional drag on the tape.

The movable guides are supported from a common bracket 56, which is, in turn, movably supported from the frame plate 10 by a pair of parallel arms 58 and 60. Each of the parallel arms is rotatably secured at one end to bracket 56 and at the other end to the frame plate 10. A tension spring 62 extends between two parallel arms and is arranged to apply a force to the parallel arms tending to pull the bracket 56 downwardly and thus maintaining tension to the tape as it passes over the guides.

The supply reel 12 is driven by a servo-motor 64 mounted in back of the frame plate 10. The shaft of the motion extends through the plate to the front end with the supply reel mounted thereto for rotation. The servo-motor 64 is fed out at a rate to maintain a certain tension in the tape as it is pulled through the operational zone by the capstan drive 22. This is accomplished by means of a potentiometer 66, also mounted in back of the frame plate 10 with the shaft of the potentiometer extending through and being joined to the parallel arm 58. Rotation of the arm changes the position of the sliding contact of the potentiometer 66.

Figure 2:
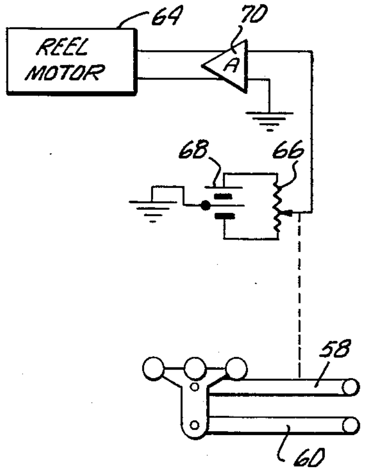
FIG. 2 is a schematic block diagram of the reel motor control of the tape transport system.

As shown in FIG. 2, the direction of rotation and the torque developed by the reel motor 64 are controlled from the potentiometer 66 by connecting the potentiometer across a center-tapped potential source 68, for example. Thus movement of the sliding contact of the potentiometer 66, with changes in position of the arm 58, produces a reversible polarity potential as applied to the input of a power amplifier 70. The output of the amplifier 70 controls the reel motor 64. Thus, it will be seen that the reel motor 64 is servo-controlled to feed out tape at a proper rate to maintain the arm 58 in a relatively fixed position. If the rate is too fast or too slow, the arm 58 is caused to move by the change in the amount of slack between the supply reel and the operational zone, producing a change in the drive rate of the reel motor 64 by an amount to restore balance to the servo-control.

Identical means is provided for maintaining slack between the take-up reel 14 and the capstan drive 22. Thus, the tape is drawn over relatively fixed rollers 67 and 69 and over relatively movable rollers 71, 72, and 74. The relatively movable rollers forming the tape guides are secured to a movable bracket 76 supported by a pair of parallel arms 78 and 80, which are each rotatably supported at one end to the main frame 10 and at the other end to the bracket 76. A spring 82 connected between the arms 78 and 80 normally urges the bracket 76 and associated moving roller guides downwardly to tension the tape.

The supply reel 14 is driven by a servo-motor 84 mounted on the back side of the frame plate 10 with the shaft of the motor extending through to the front of the frame plate 10 and having the take-up reel mounted thereon. A potentiometer 85 is also mounted on the back side of the frame plate 10 with its shaft being connected for rotation by the parallel arm 78.

The take-up reel motor 84 is controlled electrically in response to movement of the parallel arm 78 by means of the potentiometer 85, the control circuit being identical to that described above in connection with FIG. 2. In this manner, the take-up reel motor 84 is controlled to take up tape at exactly the rate at which it is fed out of the operational zone by the capstan drive 22.

It will be appreciated from the description thus far that if the brake solenoid 42 is suddenly energized and the capstan drive released, the sudden stopping of the tape in the operational zone causes a shortening of the length of tape between the operational zone and the tape-up reel 14. The take-up reel 14 and associated servo-motor 84 form a relatively high inertia system. The shortening of the tape causes the bracket 76 to rise against the action of the spring 82, rotating the parallel arm 78 and repositioning the potentiometer 85. The result is to reverse the torque to the servo-motor 84 to stop rotation of the take-up reel 14. However, even though the servo-system is capable of stopping the take-up reel at a sufficient rate not to use up all the slack in the tape when the brake is applied, a very high initial acceleration of the movable tape guide assembly is produced by a sudden stopping of the tape in the operational zone. The shorter the time in which the tape is stopped in the operational zone, the greater is the acceleration of the movable tape guide assembly. Because three movable tape guides are required to provide sufficient tape slack for operation at the high tape speed required of the system, the inertia of the moving tape guide assembly is relatively high. As a result, the tension applied on the tape when the brake is applied becomes quite large and if a sufficient braking force could be applied to stop the tape against this increased tension to the tape in the required space, the tape would snap. With a smaller braking force, the brake is unable to stop the tape within less than a character length.

This problem is overcome in the present invention by the provisions of a relatively low inertia yieldable support for the tape between the capstan drive 22 and the take-up reel 14. The yieldable system provides additional buffering between the operational zone and the movable tape guide assembly which absorbs the load otherwise imposed directly on the brake and tape by the high acceleration of the moving tape guide assembly. This is accomplished by a flipper arm assembly, shown in more detail in FIGS. 2 and 3.

Figure 3:
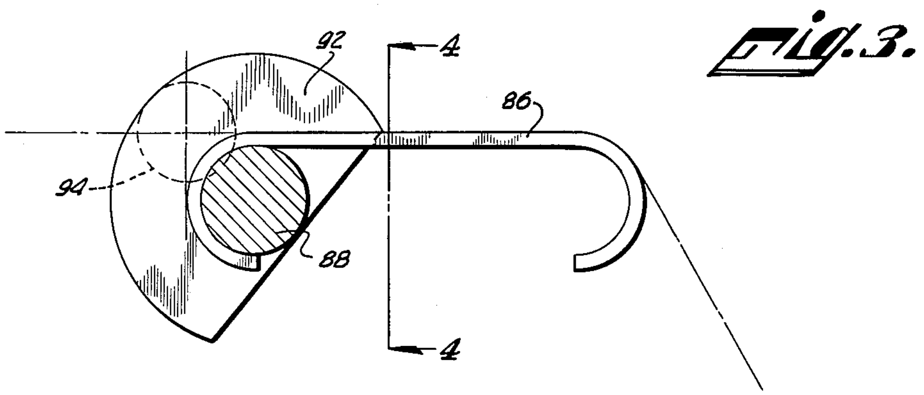
FIG. 3 is an enlarged showing of the pivoted arm assembly used in the present invention.
Figure 4:
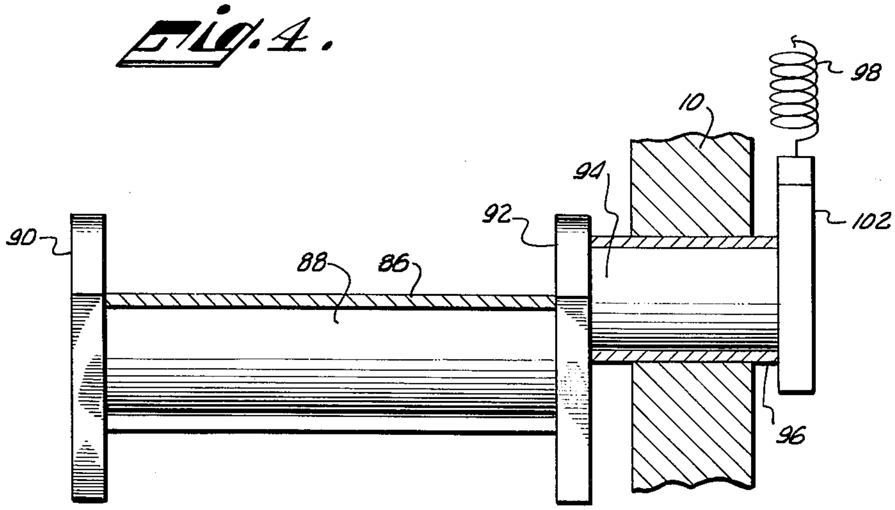
FIG. 4 is a sectional view taken on the line 4—4 of FIG. 3.

As the tape leaves the capstan drive 22, it passes over a cantilever type flipper arm 86 which is rounded at both ends, as best seen in FIG. 3. The flipper arm 86 is supported at one end by a section of shaft 88 to which the inner surface of the rounded end of the flipper arm 86 is secured by soldering, brazing or other suitable means. Guide plates 90 and 92 are provided on either end of the shaft section 88. This flipper assembly is pivotally supported from the main frame 10 by a shaft 94 which may be integrally formed with the guide plate 92 and shaft 88. The shaft 94 is journaled in the frame plate 10 by a suitable bearing, such as a sleeve bearing 96. The axis of rotation of the shaft 94 is offset from the center line of the shaft 88. The amount of offset is arranged so that the axis of rotation of the shaft 94 lies in the plane of the flipper arm surface across which the tape passes. By this arrangement, movement of the flipper arm with increased tension on the tape does not apply a leverage action on the tape by wrapping of the tape about the rounded ends of the flipper arm. This prevents any pulling of tape from the operational zone, as will be hereinafter more fully explained.

The flipper arm 86 is normally maintained in a substantially horizontal position by means of a tension spring 98 on the back side of the frame plate 10. The spring 98 is anchored at one end to a lug 100 on the back side of the frame plate 10 and at the other end to a crank arm 102 which is secured to the opposite end of the shaft 94 from the guide plate 92. The crank arm 102 is normally held against a stop lug 104 on the back side of the frame plate 10.

With the flipper arm thus held in position, the tape, after passing over the flipper arm, is pulled downwardly at an angle to the plane of the arm over the curved outer end of the flipper arm and threaded around the first movable tape guide 70. With the brake applied to the tape in the operational zone, an increase in tension of the tape from the side of the take-up reel results in a rotational movement applied to the flipper arm 86 about the axis of the shaft 94. The tension must be sufficient to overcome the preloading effect of the spring 98 before the outer end of the flipper arm 86 moves downwardly to provide additional slack in the tape. This additional slack provided by the flipper arm 86 gives sufficient buffering to permit the movable tape guide assembly to initially accelerate. Thus, the shock of accelerating the mass of the movable tape assembly is absorbed through the flipper arm by the spring 98. Initial loading of the spring 98 is such that the tension in the tape must substantially exceed the normal tension in the tape produced by the spring 82 during steady state operating conditions before the flipper arm can be moved.

From the above description, it will be recognized that the flipper arm assembly provides a relatively low inertia tensioning device but having limited slack capacity. The majority of the slack loop capacity is afforded by the moving tape guide assembly. The combination of the two assemblies between the operational zone 15 and the take-up reel 14 provides a large slack loop capacity with a minimum of inertia loading reflected back to the brake.

What is claimed is:

1. Transport apparatus for tape comprising a supply reel and a take-up reel for the tape, a drive capstan, the tape passing from the supply reel to the take-up reel past the drive capstan, means for engaging the tape with the capstan to drive the tape through an operational zone, brake means including a platen across which the tape is pulled by the drive capstan, a spring-loaded shoe for pressing the tape against the platen, and a solenoid for imparting a braking pressure to the shoe against the tape and platen, the braking solenoid operating to stop movement of the tape in the operational zone when energized, means including spring-loaded idlers for maintaining tensioned loops in the tape respectively between the supply reel and the brake means and between the take-up reel and the drive capstan, means associated with the supply reel for applying a torque thereto in a direction and amount controlled by the position of the associated idler, means associated with the take-up reel for applying a torque thereto in a direction and amount controlled by the position of the associated idler, and means for absorbing the excess tension in the tape between the brake and the take-up reel when the brake is energized including a cantilever arm over which the tape is drawn by the take-up reel, means for pivotally supporting the cantilever arm at one end thereof with the pivotal axis lying in the normal plane of the tape as it passes over the arm, means including a spring for urging the free end of the pivoted cantilever arm into a normal position against the pull on the tape by the take-up reel, and means for guiding the tape at an angle to the plane of the cantilever arm as the tape passes over the free end thereof, whereby an increase in tension in excess of a predetermined amount acts to pivot the cantilever arm against the urging of the spring.

2. Transport apparatus for tape comprising a take-up reel for the tape, a drive capstan, the tape passing to the take-up reel past the drive capstan, means for engaging the tape with the capstan to drive the tape through an operational zone, brake means including a platen across which the tape is pulled by the drive capstan, a spring-loaded shoe for pressing the tape against the platen, and a solenoid for imparting a braking pressure to the shoe against the tape and platen, the braking solenoid operating to stop movement of the tape in the operational zone when energized, means including a spring-loaded idler for maintaining tensioned loops in the tape between the take-up reel and the drive capstan, means associated with the take-up reel for applying a torque thereto in a direction and amount controlled by the position of the associated idler, and means for absorbing the excess tension in the tape between the brake and the take-up reel when the brake is energized including a cantilever arm over which the tape is drawn by the take-up reel, means for pivotally supporting the cantilever arm at one end thereof with the pivotal axis lying in the normal plane of the tape as it passes over the arm, spring means for urging the free end of the pivoted cantilever arm into a normal position against the pull on the tape by the take-up reel, and means for guiding the tape at an angle to the plane of the cantilever arm as the tape passes over the free end thereof, whereby an increase in tension in excess of a predetermined amount acts to pivot the cantilever arm against the urging of the spring means.

3. Transport apparatus for tape comprising a take-up reel for the tape, drive means engageable with the tape to draw the tape through an operational zone, brake means including a platen across which the tape is pulled by the drive means, a spring-loaded shoe for pressing the tape against the platen, and a solenoid for imparting a braking pressure to the shoe against the tape and platen, the braking solenoid operating to stop movement of the tape in the operational zone when energized, means including a spring-loaded idler for maintaining tensioned loops in the tape between the take-up reel and the drive means, means associated with the take-up reel for applying a torque thereto in a direction and amount controlled by the length of the tensioned loops, and means for absorbing the excess tension in the tape between the brake and the take-up reel when the brake is energized including a cantilever arm over which the tape is drawn by the take-up reel, means for pivotally supporting the cantilever arm at one end thereof with the pivotal axis lying in the normal plane of the tape as it passes over the arm, spring means for urging the free end of the pivoted cantilever arm into a normal position against the pull on the tape by the take-up reel, and means for guiding the tape at an angle to the plane of the cantiveler arm as the tape passes over the free end thereof, whereby an increase in tension in excess of a predetermined amount acts to pivot the cantilever arm against the urging of the spring means.

4. Transport apparatus for tape comprising a take-up reel for the tape, drive means engageable with the tape to draw the tape through an operational zone, brake means including a platen across which the tape is pulled by the drive means, a spring-loaded shoe for pressing the tape against the platen, and a solenoid for imparting a braking pressure to the shoe against the tape and platen, the braking solenoid operating to stop movement of the tape in the operational zone when energized, means including a spring-loaded idler for maintaining a tensioned loop in the tape between the take-up reel and the drive means, means associated with the take-up reel for applying a torque thereto in a direction and in amount controlled by the length of the tensioned loop, and means for absorbing the excess tension in the tape between the brake and the take-up reel when the brake is energized including a cantilever arm over which the tape is drawn by the take-up reel, means for pivotally supporting the cantilever arm at one end thereof, spring means for urging the free end of the pivoted cantilever arm into a normal position against the pull on the tape by the take-up reel, and means for guiding the tape at an angle to the plane of the cantilever arm as the tape passes over the free end thereof, whereby an increase in tension in excess of a predetermined amount acts to pivot the cantilever arm against the spring means.

5. A tape transport comprising drive means for engaging the tape and pulling the tape through an operational zone, a take-up reel for receiving the tape, means for tensioning the tape between the drive means and the take-up reel including idler pulley means, reel drive means connected to the take-up reel, and means responsive to the positioning of the idler pulley means for controlling the amount and direction of torque applied to the take-up reel by the reel drive means, brake means for engaging and stopping the tape ahead of the operational zone to stop tape from being pulled through the operational zone by the drive means, and means for absorbing excess tension in the tape when the brake means is engaged including an arm pivotally supported at one end and means for spring-loading the arm against pivotal movement, the tape being drawn over the arm in passing from the tape drive means to the take-up reel, the spring loading of the arm being substantially in excess of the pivotal moment applied to the arm by the tape under normal operating tension imposed by the idler pulley means.

6. A tape transport comprising drive means for engaging the tape and pulling the tape through an operational zone, a take-up reel for receiving the tape, means for tensioning the tape between the drive means and the take-up reel, reel drive means connected to the take-up reel, and means responsive to the change in tension of the tape for controlling the amount and direction of torque applied to the take-up reel by the reel drive means, brake means for engaging and stopping the tape ahead of the operational zone to stop tape from being pulled through the operational zone by the drive means, and means for absorbing excess tension in the tape when the brake means is engaged including an arm pivotally supported at one end and means for spring-loading the arm against pivotal movement, the tape being drawn over the arm in passing from the tape drive means to the take-up reel, the spring-loading of the arm being substantially in excess of the pivotal moment applied to the arm by the tape under normal operating tension imposed by the tensioning means.

7. A high speed transport apparatus for moving a flexible medium through an operational zone comprising drive means engaging the medium for pulling the medium through the operational zone, a high speed brake engaging the tape in the operational zone for stopping movement of the medium through the operational zone, means for reeling up the medium after it is driven through the operational zone, means associated with the reeling means for stopping the reeling means when the brake is applied to the medium, means for normally maintaining slack in the medium between the drive means and the reeling means to permit the reeling means to be stopped at a slower rate than the medium is stopped by the brake, said slack maintaining means including first tensioning means engaging the medium in the slack region and movable with changes in the slack length of the medium for maintaining tension in the medium between the drive means and the reeling means, said first tensioning means having a large range of movement with relatively small changes in tension of the medium, and further including second tensioning means engaging the medium in the slack region, said second tensioning means having a small range of movement with relatively large changes in tension of the medium, and means for preloading the second tensioning means to prevent movement of the second tensioning means until the tension in the medium in the slack region exceeds an amount necessary to overcome the preloading.

8. A high speed transport apparatus for moving a flexible medium through an operational zone comprising drive means engaging the medium for pulling the medium through the operational zone, a high speed brake engaging the tape in the operational zone for stopping movement of the medium through the operational zone, means for reeling up the medium after it is driven through the operational zone, means associated with the reeling means for stopping the reeling means when the brake is applied to the medium, means for normally maintaining slack in the medium between the drive means and the reeling means to permit the reeling means to be stopped at a slower rate than the medium is stopped by the brake, said slack maintaining means including first tensioning means engaging the medium in the slack region and movable with changes in the slack length of the medium for maintaining tension in the medium between the drive means and the reeling means, said first tensioning means having a large range of movement with relatively small changes in tension of the medium, and second tensioning means engaging the medium in the slack region, said second tensioning means having a small range of movement with relatively large changes in tension of the medium.

9. A high speed tape transport system having an operational zone past which tape is transported by a tape driving means and a tape take-up means for taking up the tape metered out by the tape driving means, the combination comprising tape braking means engageable with the tape for stopping tape movement in the operational zone substantially instantaneously, means for braking the tape take-up means, means maintaining a slack loop of tape under substantially constant tension between the tape driving means and tape take-up means, said last-named means providing a relatively large slack capacity for tape to allow the tape take-up means to be brought to a stop without breaking the tape, and compliant tape supporting means positioned between the operating zone and the take-up means and having a relatively small range of movement and a relatively small inertia compared to the slack loop tensioning means for absorbing the snap in the tape when the tape is stopped instantly in the operational zone.

References Cited in the file of this patent

UNITED STATES PATENTS

| | | |
|---|---|---|
| 1,314,178 | Wood | Aug. 26, 1919 |
| 2,622,813 | Lindsay | Dec. 23, 1952 |
| 2,669,398 | Olson | Feb. 16, 1954 |
| 2,814,676 | House | Nov. 26, 1957 |